(No Model.) 2 Sheets—Sheet 1.
H. PETERS.
COTTON CHOPPER AND CULTIVATOR.

No. 558,307. Patented Apr. 14, 1896.

FIG. I.

Witnesses
Jas. K. McCathran
J. B. Clements

Inventor
Henry Peters
By his Attorneys.
C. A. Snow & Co.

(No Model.) 2 Sheets—Sheet 2.

H. PETERS.
COTTON CHOPPER AND CULTIVATOR.

No. 558,307. Patented Apr. 14, 1896.

Witnesses

Jas. K. McCathran

Inventor
Henry Peters
By his Attorneys.
C. A. Snow & Co.

ANDREW B. GRAHAM, PHOTO-LITHO, WASHINGTON, D.C.

United States Patent Office.

HENRY PETERS, OF MEMPHIS, TENNESSEE, ASSIGNOR TO THOMAS G. BALDWIN, OF SAME PLACE.

COTTON CHOPPER AND CULTIVATOR.

SPECIFICATION forming part of Letters Patent No. 558,307, dated April 14, 1896.

Application filed April 11, 1895. Serial No. 545,320. (No model.)

*To all whom it may concern:*

Be it known that I, HENRY PETERS, a citizen of the United States, residing at Memphis, in the county of Shelby and State of Tennessee, have invented a new and useful Cotton Chopper and Cultivator, of which the following is a specification.

This invention relates to an improvement in cotton choppers and cultivators of that class which are adapted to travel across the rows of corn and to act thereon in such a way as to cut out superfluous plants and at the same time to cultivate the plants which are left standing.

In the raising of cotton it is generally sown in rows at a distance of from three to five feet apart. After the cotton is up to a good stand, it is bared with a turning plow or operated upon by a scraper, which prepares it for the hoe. The common plan is to chop through the row, leaving from one to three stalks in a place.

The principal object of this invention is to provide a machine which will be adapted to travel across the rows and accomplish the work of removing superfluous plants or thinning out the plants as required.

It is also a further object of this invention to thoroughly cultivate the ground simultaneously with the removal of the surplus cotton and to "dirt" the plants or bank up the loosened earth around the same in a manner well understood. This end I attain by providing a transversely-extending steel plate, which has one edge sharpened and made capable of cutting the earth, and which has formed in said edge a series of notches which divide the edge into separate diggers and which also serve as a means for permitting the passage of that cotton which is to be left standing. This plate is hingedly connected to the axle of the machine and coöperates with a laterally-reciprocating harrow-beam mounted upon the frame of the machine and connected with the moving parts thereof, so as to reciprocate laterally or transversely in front of the digger-plate. There is also arranged at the rear of the machine a series of spring-teeth, which operate to throw the dirt up against the plants, as is necessary in the cultivation of all classes of plants.

Figure 1:
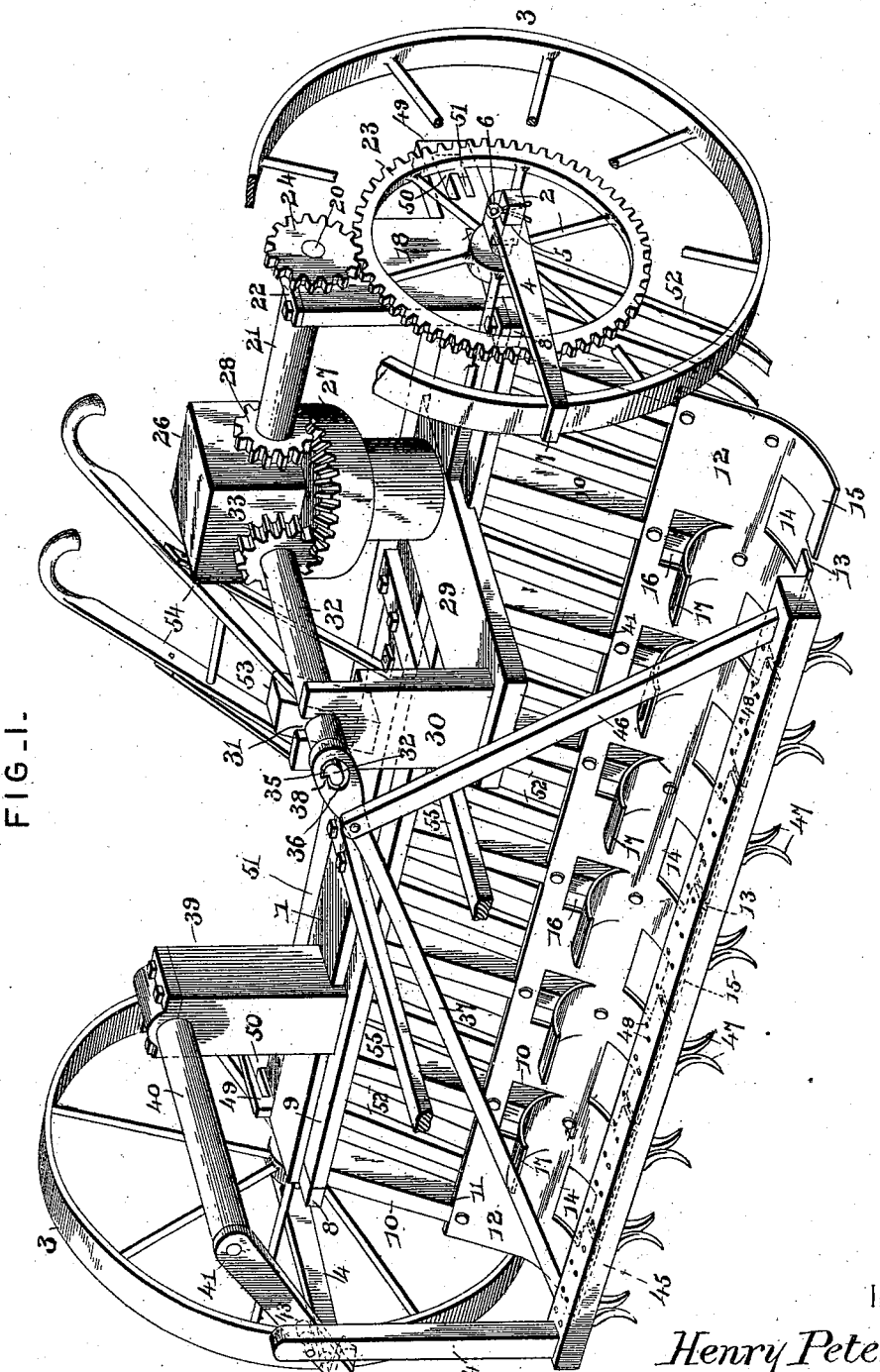
Figure 2:
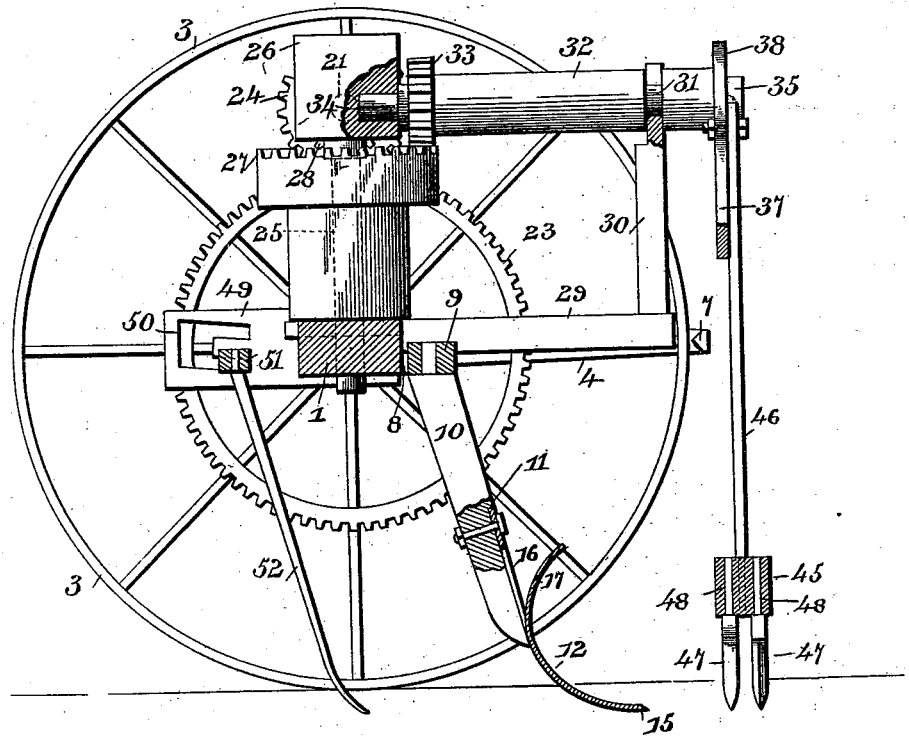
Figure 3:
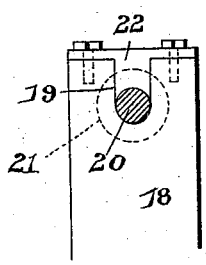
Figure 6:
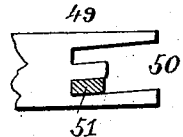
Figure 4:
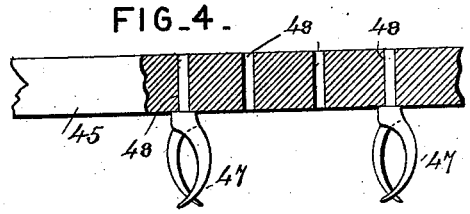
Figure 5:
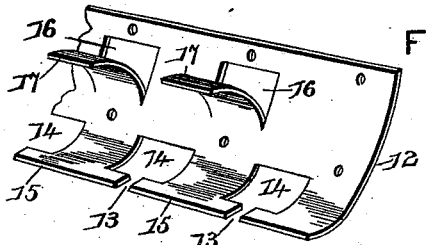

In the accompanying drawings, Figure 1 represents a perspective view of a cotton chopper and cultivator embodying the essential features of my invention. Fig. 2 is a longitudinal section thereof. Fig. 3 is a detail elevation of a bearing for one of the shafts. Fig. 4 is a sectional view of a part of the harrow-beam. Fig. 5 is a detail perspective of the digger-plate. Fig. 6 is a detail perspective of one section of the device for mounting the cultivator-beam.

The reference-numeral 1 indicates the axle of my machine, and this is formed comparatively heavy and provided with reduced journals 2, upon which the wheels 3 are revolubly mounted.

The wheels 3 may be of any suitable class.

4 indicates two scrapers, which are one for each wheel 3, and which comprise a longitudinally-extending main portion located alongside of its respective wheels and having a square opening 5 through which a correspondingly-shaped end of the journal adjacent thereto passes, the whole being held in place by a pin 6. The main portions of the scraper 4 project forwardly to the front side of the wheels and are there formed with transversely and inwardly extending scrapers proper, 7. These scrapers have edges formed thereon and engage with the peripheries of the wheels, so as to remove from said peripheries all mud and earth that may cling thereto.

Rigidly secured to the front side of the axle 1 and at each end thereof are the arms 8, in which the trunnions of the transverse beam 9 are respectively journaled, so that the beam will be mounted parallel with the axle 1 and at the front thereof and will be capable of oscillating as its operation may require. Rigidly secured, by mortising, to the transverse beam 9 are the downwardly and forwardly projecting arms 10, which are preferably eight in number, though this is not essential, and which have their lower front ends cut away to form recesses 11. These recesses are horizontally alined with each other and are provided for the reception of the digger-plate 12, referred to hereinbefore. The plate 12 is formed of steel and has its lower edge bent horizontally and sharpened to serve as the digging edge. Formed in this digging edge of the plate 12 are the slots 13, which extend transversely with the plate and which terminate at their upper or rear ends in the enlarged openings 14. The openings 14 are one for each of the slots 13, and the slots are provided to allow a portion of the cotton-plants to remain standing while others are cut out. These slots or openings are preferably seven in number, so as to form eight diggers 15 and a half or fragmentary digger at each end of the plate and in addition to the whole diggers.

Formed in the plate 12, inward from the openings 14, are the openings 16, which have the metal formerly embraced therein bent upwardly and forwardly to form tongues 17. These tongues 17 are one for each of the openings 16, and are located, respectively, in longitudinal alinement with the diggers 15, so that they will prevent the earth from arising on the plate 12. The arms 10 are rigidly secured to the plate 12 at points directly adjacent to the openings 16, as may be seen by reference to the drawings, though this arrangement is not essential to the invention.

Arising vertically from the left-hand end of the axle 1 is the standard 18, which is secured to the axle by any preferred means and which has its upper end formed with a notch 19, serving as a bearing for the trunnion 20 of the shaft 21. The notch 19 is provided with a cap or block 22, which is fitted therein and provided with set-screws by which it may be held in place, thus closing the notch and forming an effective bearing for the trunnion. Fixed to or formed integral with the inner side of the left-hand wheel 3 is a spur-gear 23, which meshes with a pinion 24, fixed to the trunnion 20, and by these means the shaft 21 is given a continuous rotary movement.

25 indicates an upright beam, which arises from the upper side of the axle 1 and just a little to the left of the middle thereof. This upright beam is provided with a head 26, in which a trunnion formed at the inner end of the shaft 21 has its bearing. Revolubly mounted upon the upright beam 25, and below the head 26 thereon, is the crown-gear 27, which has a vertically-elongated body portion, and the same is rested upon the axle 1, thereby mounting the crown-gear in place. The crown-gear 27 meshes with a pinion 28, rigidly secured to the inner end of the shaft 21, and by these means the movements of shaft 21 are transmitted to the crown-gear 27.

Rigidly secured to the axle 1 and projecting forwardly and at right angles therefrom is the beam 29, which has its front end provided with an upwardly-projecting portion 30, the upper end of which is formed with an open bearing in which the reduced portion 31 of the shaft 32 is revolubly mounted. The shaft 32 extends longitudinally and has its rear end provided with a pinion 33, which meshes with the crown-gear 27, and whereby the shaft 32 is driven. Thus it will be seen that the movements of the left-hand wheel 3 are transmitted to the shaft 32, and the same caused to revolve continuously. The rear end of the shaft 32 is provided with a reduced journal 34, which is revolubly mounted in a corresponding bearing formed in the head 26 of the beam 25.

The front extremity of the shaft 32 is formed with an eccentric or cam-shaped portion 35, which fits within an opening 36 formed in the diagonally-disposed beam 37. The opening 36 of the beam 37 is formed with an internal shoulder 38 thereon, which is adapted to be engaged by the eccentric or cam-shaped portion 35 of the shaft 32, and whereby the beam 37 is reciprocated diagonally, as will be better described hereinafter.

Rigidly secured to and arising vertically from the right-hand portion of the axle 3 is the beam 39, which has projecting horizontally and forwardly from its upper end the arm 40. This arm 40 has its front end reduced to form a spindle-like portion or journal received in a corresponding opening formed in the upper end of the link 41, a pin or key being passed through the extremity of the reduced portion or journal. By these means the link 41 is mounted so as to be capable of swinging transversely, and the lower portion of the link is formed with a series of vertically-alined openings 42, in which the stud 43 of the arm 44 may be received. By means of the plurality of the openings 42 the arm 44 may be adjusted thereon to suit the depth at which it is desired that the lower end of the arm shall extend.

The lower extremity of the arm 44 is mortised into the harrow-beam 45, and this beam extends horizontally and transversely the entire width of the machine, and has the beam 37 rigidly secured to that end to which the arm 44 is secured. The beam 37 has rigidly secured to its upper end the bar 46, which extends downwardly and slightly outwardly or transversely, and which is mortised into the left-hand extremity of the beam 45. Thus it will be seen that the beam 45 is mounted so as to be capable of being reciprocated transversely and in a horizontal line.

Rigidly secured to the beam 45, and projecting downwardly from its under side, are the teeth 47, which may be of any preferred number and which are arranged in pairs, each pair being located between the several slots 13, so that in the operation of the beam 45 they will reciprocate between these slots and will not pass the longitudinal lines of the same. By these means the ground is cultivated between the rows which are formed by the slots 13, and that portion of the land which lies in the longitudinal lines of said slots, and which is to compose the rows formed by the machine, left uninfluenced by their operation. The beam 45 is provided with a series of openings 48, extending throughout its length and arranged in pairs, the members of which are longitudinally alined with each other. By means of these openings the teeth 47 may be adjusted to the various positions which it may be desired that they assume. It will be understood that the reciprocation of the beam 45, and its attached beam 39, will be brought about by the joint operation of the eccentric or cam-shaped portion 35 and the shoulder 38 of the opening 36.

Rigidly secured to the rear side of the axle 1, and projecting rearwardly therefrom, are the vertically-widened beams 49, which are two in number, located one at each end of the axle, and which have formed therein openings 50. These openings 50 each comprise an enlarged or main portion located at the rear ends of the beams and having communicating with their front portions two offsets or independent notches, which are located one above the other, and which are provided to permit adjusting the beam 51 to either height of said offset portions. The opening 50 at the right-hand beam 49 has an open rear side, so as to permit the removal and introduction of the beam 51, and the said beam has its ends formed with reduced and flattened portions which are capable of fitting within the offset parts of the openings 50. Thus it will be seen that the beam 51 may be replaced or placed with perfect ease, and that it may be adjusted to various heights, as explained. Rigidly secured to the beam 51, and projecting downwardly and a very little bit forwardly therefrom, are the spring cultivator-teeth 52, which are two for each slot 13, and which are so arranged that they will travel one on each side of the several rows formed by said slots. The teeth 52 are made to engage with the ground, as of course will be understood, and as the machine moves in its operation they will throw the dirt up against each side of every plant and thereby perform an operation which is essential to all cotton choppers and cultivators and which has been explained hereinbefore.

Arising vertically from the middle of the axle 1 is the arm 53, which is provided to permit the attachment of the handles 54, and which has said handles rigidly attached to it. The handles are used in the same manner as other handles of this class and do not differ therefrom in construction. The shafts of the machine are designated by the numeral 55 and are rigidly secured to the middle of the axle and at the upper side thereof and project forwardly. They are here shown to be adapted for use with a single horse or mule, and in most forms of my invention this will be sufficient, though it will be possible to apply two horses, or, indeed, any number, as will be understood.

The operation of my invention will be understood without very extensive description. It will suffice for me to say that the team should be hitched to the shafts 55 and drawn across the rows to be cultivated. The movement of the machine will result in an operation of the harrow-beam and simultaneously in the thinning out of the cotton-plants by the operation of the plate 12. Finally, the harrow-teeth 47 will pass on each side of the standing plants and throw the dirt up against the same, thus performing the operation known to farmers as "dirting."

Various changes in the form, proportion, and the minor details of construction may be resorted to without departing from the principle or sacrificing any of the advantages of this invention.

Having described the invention, I claim—

1. In a cotton chopper and cultivator, the combination of an axle, carrying-wheels mounted thereon, a transverse beam rotatably mounted parallel with and to the front of the axle, arms secured to said beam and projecting downwardly therefrom, a digger-plate fixed to the arms and having horizontally-disposed diggers thereon capable of cutting out certain plants and of leaving other plants standing in rows, a harrow-beam reciprocally mounted forward of the digging-plate, means connected to the harrow-beam by which it is operated, and cultivator-teeth secured to the machine rearward of the digging-plate and arranged to lie on either side of the several rows formed by the machine, and to throw dirt against the same, substantially as described.

2. In a cotton chopper and cultivator, the combination with a suitably-mounted axle, of a transverse beam mounted parallel with and forward of the same, arms secured to the transverse beam and projecting downwardly therefrom in parallel alinement, and a digging-plate fixed to the several arms and having a horizontal digging edge, the said plate being formed with slots 13 therein, each of which terminates in openings 14 at their inner ends, substantially as described.

3. A cotton chopper and cultivator having a digging-plate arranged transversely thereon and having its lower edge capable of engaging the ground and extending horizontally, said edge being formed with a plurality of slots therein capable of leaving cotton-plants standing and unaffected by the operation of the remainder of the plate, and an upwardly and forwardly curved dirt-deflector provided in the rear portion of said plate between said slots, substantially as described.

4. In a cotton chopper and cultivator, the combination of a supporting-frame, a transversely-disposed digging-plate fixed to the frame and arranged horizontally and provided at intervals with openings, and a horizontally-disposed harrow-beam reciprocally mounted in advance of the digging-plate and provided with teeth, substantially as described.

5. A cotton chopper and cultivator, having mounted transversely thereon a digging-plate arranged so that one edge will be capable of engaging the ground, said edge having formed therein a series of slots each terminating at its inner end in an enlarged opening, the plate also having, inward of said enlarged openings and out of longitudinal alinement therewith, a series of tongues 17 bent upwardly and forwardly toward the edge having the slots, substantially as described.

6. In a cotton chopper and cultivator, the combination with cutting edges or blades for chopping the cotton and for leaving rows of the same, of a harrow-beam mounted transversely and in front of said chopping mechanism, teeth on the beam and engaging the ground, means for reciprocally mounting the harrow-beam, a longitudinally-extending shaft having an eccentric or cam-shaped portion thereon and engaging with the harrow-beam, a pinion on the longitudinally-extending shaft, suitably geared with a moving part of the machine whereby said shaft is rotated, substantially as described.

7. In a cotton chopper and cultivator, the combination with means for chopping the cotton and for leaving rows thereof, of a transversely-extending harrow-beam, means for reciprocally mounting the same in place, a beam in connection with the harrow-beam and having an opening therein which is formed with an internal shoulder, a longitudinally-extending shaft having its front end fitted within the said opening, that portion of the longitudinal shaft which is fitted in the said opening being formed eccentric or cam-shaped, so as to engage with the shoulder and to impart a reciprocal movement to the beam thereof and to the harrow-beam, a pinion-gear fixed to the rear end of the longitudinal shaft, a crown-gear meshing with the pinion, a transverse shaft, a pinion thereon meshing with the crown-gear, one end of the transverse shaft being extended to one wheel of the machine, a pinion on said end of the transverse shaft, and a spur-gear fixed to the adjacent wheel and meshing with the pinion, substantially as described.

In testimony that I claim the foregoing as my own I have hereto affixed my signature in the presence of two witnesses.

HENRY PETERS.

Witnesses:
P. W. McGUIRE,
C. M. SLOAN.